(12) United States Patent
Gieseke, Sr.

(10) Patent No.: US 11,827,469 B1
(45) Date of Patent: Nov. 28, 2023

(54) METHODS AND APPARATUS FOR GRIPPING LARGE OBJECTS

(71) Applicant: Gerald Gieseke, Sr., Yakima, WA (US)

(72) Inventor: Gerald Gieseke, Sr., Yakima, WA (US)

( * ) Notice: Subject to any disclaimer, the term of this patent is extended or adjusted under 35 U.S.C. 154(b) by 0 days.

(21) Appl. No.: 17/953,178

(22) Filed: Sep. 26, 2022

(51) Int. Cl.
*B65G 7/12* (2006.01)
*B25J 1/02* (2006.01)

(52) U.S. Cl.
CPC . *B65G 7/12* (2013.01); *B25J 1/02* (2013.01)

(58) Field of Classification Search
CPC . B65G 7/12; B65G 49/061; B25J 1/02; B25B 5/02; B25B 5/102; B25B 5/127; B25B 9/04; E04G 21/162
USPC ...................................... 294/16, 34, 62, 901
See application file for complete search history.

(56) References Cited

U.S. PATENT DOCUMENTS

| | | | |
|---|---|---|---|
| 139,157 A * | 5/1873 | Jackson et al. | |
| 836,740 A | 11/1906 | Dettenborn | |
| 1,215,350 A | 2/1917 | Dietrich | |
| 1,479,711 A | 1/1924 | Cato | |
| 1,837,425 A | 12/1931 | Frank | |
| 1,982,225 A | 11/1934 | William | |
| 2,156,195 A | 4/1939 | Robillard-Levis | |
| 2,665,162 A | 1/1954 | Scott et al. | |
| 2,793,065 A | 5/1957 | McCurry | |
| 2,850,318 A | 9/1958 | Mulhern | |
| 2,936,192 A * | 5/1960 | Lince .................... | B65B 7/2807 294/16 |
| 2,967,730 A * | 1/1961 | Vann ..................... | E04G 21/162 294/31.1 |
| 3,000,662 A | 9/1961 | Scarlett | |
| 3,253,849 A | 5/1966 | Hansen | |
| 3,374,024 A | 3/1968 | Le Roy | |
| 3,414,910 A | 12/1968 | Provi et al. | |
| 3,524,670 A | 8/1970 | Ilich | |
| 4,078,839 A | 3/1978 | Chambers et al. | |
| 4,349,225 A | 9/1982 | Collins et al. | |
| 4,417,361 A * | 11/1983 | Smith .................... | A47K 3/003 4/577.1 |
| 4,437,654 A | 3/1984 | Chiappetti | |

(Continued)

OTHER PUBLICATIONS

V-155 Series Gripper, instruction sheet, Nupro Products, LLC (2020).
V-155 Gripper, brochure, Nupro Products, LLC (2020).

*Primary Examiner* — Dean J Kramer
(74) *Attorney, Agent, or Firm* — SIERRA IP LAW, P.C.; Mark D. Miller

(57) ABSTRACT

The present invention provides improved methods and apparatus for securely gripping objects or panels having cross sections, including heavy objects such as granite slabs to be used as counter tops, or lighter objects such as doors or windows, in order to facilitate lifting, moving, transporting, installing and/or storage thereof. A pair of jaws are provided between a rotatable turnbuckle and ratchet assembly which opens or closes the jaws around an object. The ratchet may be used to impart fine rotation to the turnbuckle in one direction to apply pressure to the jaws to firmly engage an object. Reversing the ratchet and rotating the turnbuckle in an opposite direction allows the object to be released. A handle on the ratchet facilitates lifting and moving the object gripped between the jaws.

20 Claims, 11 Drawing Sheets

(56) References Cited

U.S. PATENT DOCUMENTS

| | | | |
|---|---|---|---|
| 4,747,588 A | | 5/1988 | Dillhoff |
| 4,968,077 A | * | 11/1990 | Redmon, Jr. ............ B65G 7/12 |
| | | | 294/16 |
| 5,921,597 A | | 7/1999 | Thiele |
| 6,113,167 A | | 9/2000 | Mattis et al. |
| 6,257,633 B1 | * | 7/2001 | Katz ...................... A45C 13/38 |
| | | | 224/268 |
| 6,276,039 B1 | | 8/2001 | Barnes |
| 6,481,767 B2 | * | 11/2002 | Pool ................... H01M 50/256 |
| | | | 294/903 |
| 6,494,513 B2 | | 12/2002 | Worthington |
| 7,003,917 B2 | | 2/2006 | Hetherington et al. |
| D543,083 S | | 5/2007 | Weinberg et al. |
| 8,312,598 B2 | | 11/2012 | Palmer |
| 9,409,712 B2 | | 8/2016 | Gieseke |
| 9,878,847 B2 | | 1/2018 | Gieseke, Sr. |
| 9,969,042 B2 | | 5/2018 | Clark |
| 10,676,037 B2 | | 6/2020 | Schactman et al. |
| 2011/0173778 A1 | | 7/2011 | Wales |
| 2014/0234069 A1 | | 8/2014 | Skijus et al. |
| 2018/0080605 A1 | | 3/2018 | Janway et al. |
| 2019/0217447 A1 | | 7/2019 | Wang |

* cited by examiner

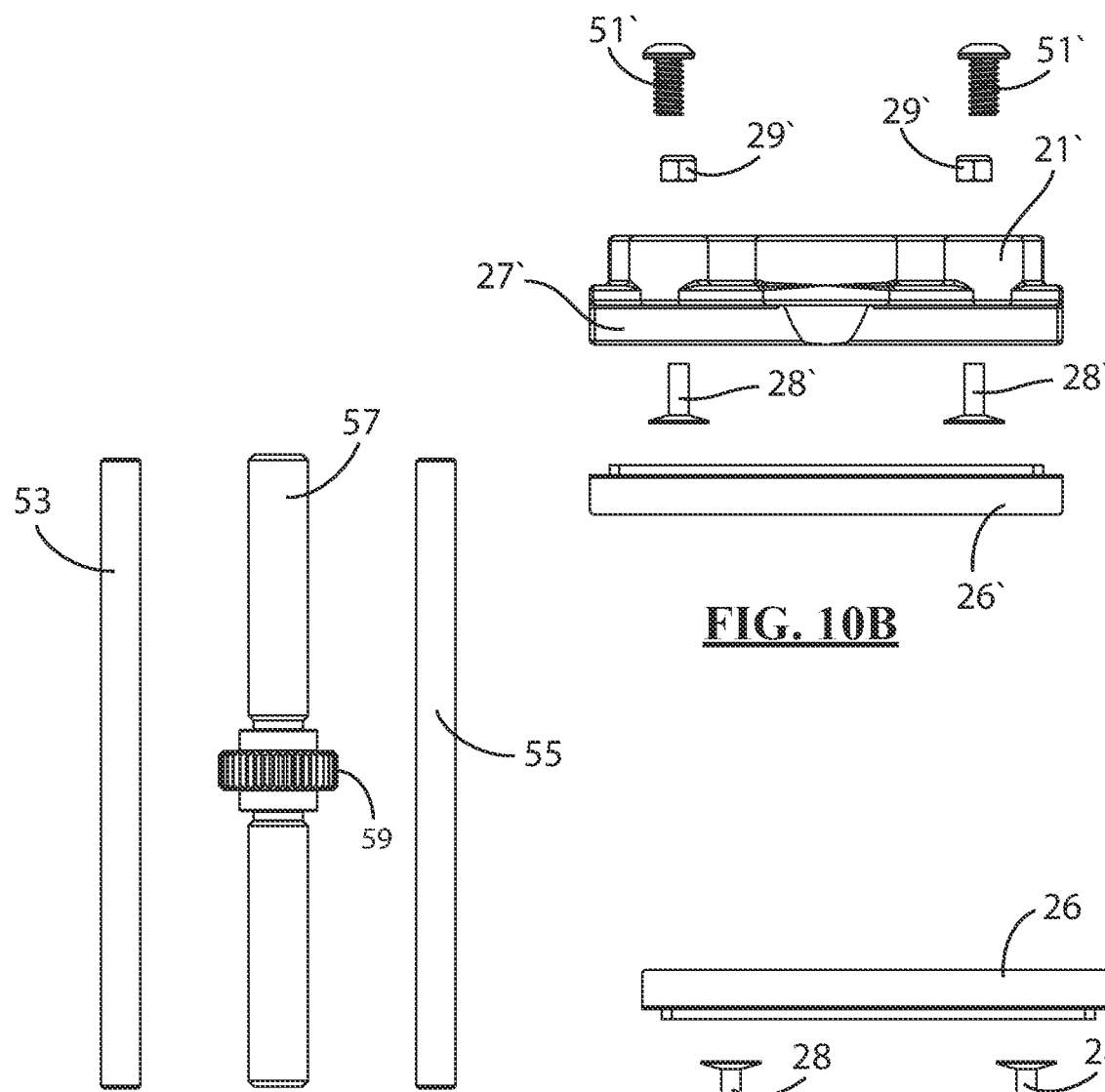
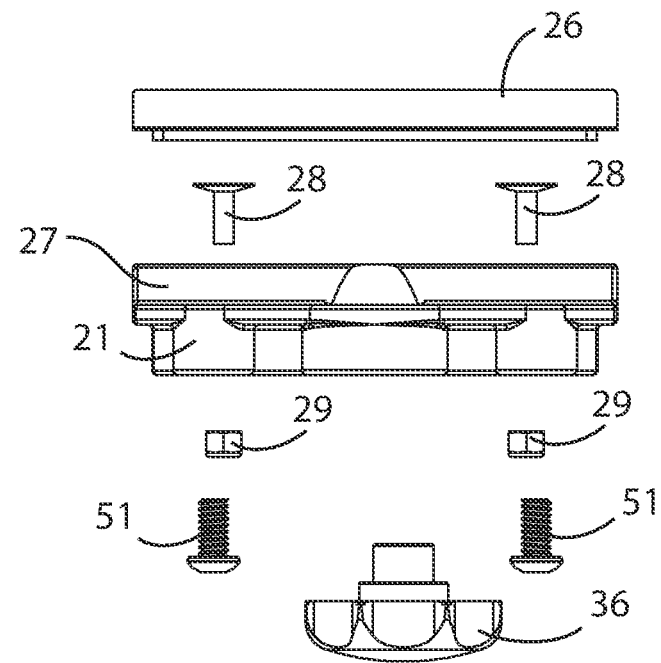
FIG. 10A
FIG. 10B
FIG. 10C

METHODS AND APPARATUS FOR GRIPPING LARGE OBJECTS

FIELD OF THE INVENTION

The present invention relates generally to the construction and transportation industries, and more particularly, relates to methods and apparatus for temporarily securely gripping objects such as panels that may be large, heavy, and/or have a wide cross section in order to facilitate lifting, transportation, installation and/or storage thereof.

BACKGROUND OF THE INVENTION

In the construction, building and transportation industries, and in other industries, there is frequently a need to lift and carry large, heavy objects, or objects with large cross sections, such as without limitation, granite slabs to be used as counter tops, sliding glass doors, multi-pane window units, doors, sheet metal panels, outdoor siding, or other similar objects. Moving, handling and transport of such object, especially heavy panels such as granite counter tops, may be difficult and awkward. As a result, workers carrying such panels are exposed to injury, and the objects themselves are exposed to damage or breakage from dropping or mishandling.

To address this issue, a number of gripping devices and apparatus have been developed over time, each having benefits and disadvantages. Many existing gripping devices provide a pair of jaws that are hingedly attached at one end such that closing the hinge brings the opposite ends of the jaws together against an object, after which a locking mechanism may be activated to hold the jaws in place. An example of such a device is a common vice clamp. Other existing gripping devices include a pair of jaws provided between the legs of a handle member, the jaws defining a space for receiving an object to be lifted, such that moving the handle in one direction opens the jaws, and moving the handle in the opposite direction closes the jaws. Unfortunately, the limited size and range of the hinges or handles on these existing devices limits them to use with smaller, thinner and lighter objects, or those having a relatively narrow cross section. As a result, there is a need for portable temporary gripping devices for use with large, heavy objects having wide cross sections in order to facilitate safe and easy lifting, handling, transportation, installation and/or storage thereof.

SUMMARY OF THE INVENTION

The present invention provides improved methods and apparatus for securely gripping objects or panels having a large cross section, including heavy objects such as granite slabs to be used as counter tops, or lighter objects such as doors or windows, in order to facilitate lifting, moving, transporting, installing and/or storage thereof. Embodiments of the gripping mechanism of the present invention include a pair of jaws having a parallel orientation that separated by at least one guide for maintaining the parallel orientation during use. Embodiments of the present invention include a threaded rod provided between the jaws which acts as a turnbuckle that can either move the jaws together or move them apart, depending on the direction of rotation. Embodiments of the invention may include a ratchet assembly with a handle that is attached to the threaded rod in order to impart fine rotation to the threaded rod in order to tightly squeeze the jaws against an object between them, or release the jaws from such an object. Once an embodiment of the invention is firmly engaged with an object, the ratchet handle may then be used to lift and manipulate the object. Embodiments of the invention may also include a knob attached to one end of the threaded rod to impart significant rotation to the rod, to open or close the jaws, before or after the fine rotation is imparted by the ratchet.

In one aspect embodiments of the present invention provide apparatus for temporarily gripping objects comprising a pair of jaw members provided in a parallel orientation to each other defining a gap therebetween; a threaded rod having a ratchet at a center thereof for rotating the rod in one of a first or a second opposite direction, wherein threads between the ratchet and one end of the rod are angled in a first direction, and wherein threads between the rachet and an opposite end of the rod are angled in a second opposite direction; a threaded bore in a first of the jaw members for rotatably receiving one end of the threaded rod, and an oppositely threaded bore in a second of the jaw members for rotatably receiving the opposite end of the threaded rod; and a handle attached to the ratchet for imparting reciprocating movement thereto, such that rotation of the rod in the first direction causes the jaw members to move towards each other and rotation of the rod in the opposite second direction causes the jaw members to move away from each other.

In some aspects, embodiments of the apparatus also comprise one or more guide rods provided between the jaw members, wherein each jaw member includes an opening therein for slidably receiving an end of one of the guide rods. In some aspects, each jaw member has a flat surface thereon that faces the flat surface of the other jaw member. In some aspects, a pad is provided on the flat surface of each jaw member. In some aspects, a knob is attached at one end of the threaded rod.

In some aspects, embodiments of the apparatus also comprise a gear on the threaded rod having teeth thereon that extend radially outward from the gear, wherein the ratchet is engaged with cogs or teeth on the gear such that engagement of a first pawl in the ratchet with the cogs allows the rod to be rotated in only the first direction, and engagement of a second pawl in the ratchet with the cogs allows the rod to be rotated in only the second opposite direction. In some aspects, embodiments further comprise a catch on the ratchet for engaging either the first pawl or the second pawl with the cogs. In some aspects, each jaw further comprises a lip along an upper end of the flat surface. In some aspects, a pad is provided on the flat surface of each jaw member, each such pad having an L-shaped cross section corresponding to each such lip. In some aspects, the gap between the jaw members may be opened to as wide as twelve inches.

In another aspect embodiments of the present invention provide methods for gripping large objects comprising the steps of rotating a knob attached to an end of a threaded rod in a first direction, such that oppositely threaded ends of the rod engaged with oppositely threaded openings in a pair of parallel jaw members rotate within the openings causing the jaw members to move apart; placing an object to be gripped between the jaws; setting a ratchet located at a center of the threaded rod to allow the rod to rotate in an opposite direction; rotating the knob to rotate the rod in an opposite direction to cause the jaws to move together and close against the object; operating the ratchet to impart further rotation of the threaded rod to tightly grip the object between the jaws; and lifting the object using a handle attached to the ratchet. Other aspects may comprise the additional steps of setting the ratchet to rotate the rod in the first direction; operating the ratchet to impart rotation of the threaded rod in the first direction to release the jaws from the object; and rotating the knob to rotate the rod in the first direction to further loosen the jaws from the object.

It is therefore an object of the present invention to provide methods and apparatus for temporarily gripping objects or panels having wide cross sections for safe and easy lifting, moving, transportation, installation and/or storage thereof.

It is also an object of the present invention to provide methods and apparatus for temporarily gripping large or heavy objects or panels for safe and easy lifting, moving, transportation, installation and/or storage thereof.

It is also an object of the present invention to provide methods and apparatus for temporarily gripping objects or panels that may be large, heavy, and/or may have wide cross sections that minimizes potential injury to users.

It is also an object of the present invention to provide methods and apparatus for temporarily gripping objects or panels that may be large, heavy, and/or may have wide cross sections that minimizes potential damage to the object that is gripped.

It is also an object of the present invention to provide methods and apparatus for temporarily gripping objects or panels that may be large, heavy, and/or may have wide cross sections at one or more locations on the object for safe and easy lifting, moving, transportation, installation and/or storage thereof.

It is also an object of the present invention to provide methods and apparatus for gripping, lifting and carrying objects or panels that may be large, heavy, and/or may have wide cross sections that may be quickly and easily engaged and disengaged from the object or panel.

The above-described objects, advantages and features of the invention, together with the organization and manner of operation thereof, will become apparent from the following detailed description when taken in conjunction with the accompanying drawings, wherein like elements have like numerals throughout the several drawings described herein. Further objects, benefits and other advantages of the present invention will become readily apparent from the detailed description of the preferred embodiments.

BRIEF DESCRIPTION OF THE DRAWINGS

FIG. 10A is a detail view of a turnbuckle and cross rods of an embodiment of the present invention.

FIG. 10B is a detail exploded view of a side of a jaw of an embodiment of the present invention.

FIG. 10C is a detail exploded view of an opposite side of a jaw of an embodiment of the present invention.

DETAILED DESCRIPTION

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention, including different combinations of the features identified herein. In the following disclosure, specific details are given to provide a thorough understanding of the invention. However, it will be apparent to one skilled in the art that the present invention may be practiced without all of the specific details provided.

Figure 1:
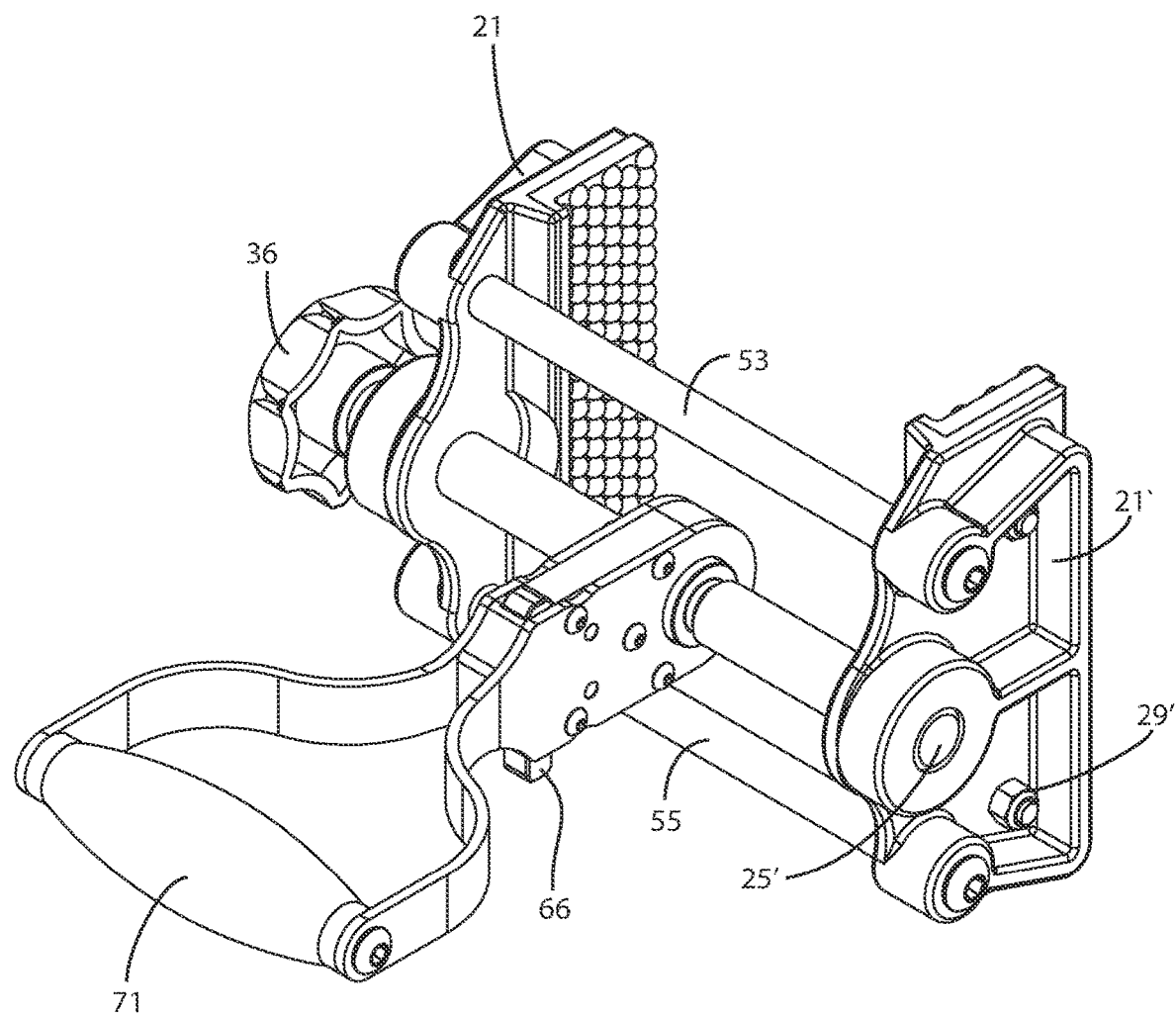
FIG. 1 is a perspective view of an embodiment of the present invention.
Figure 2:
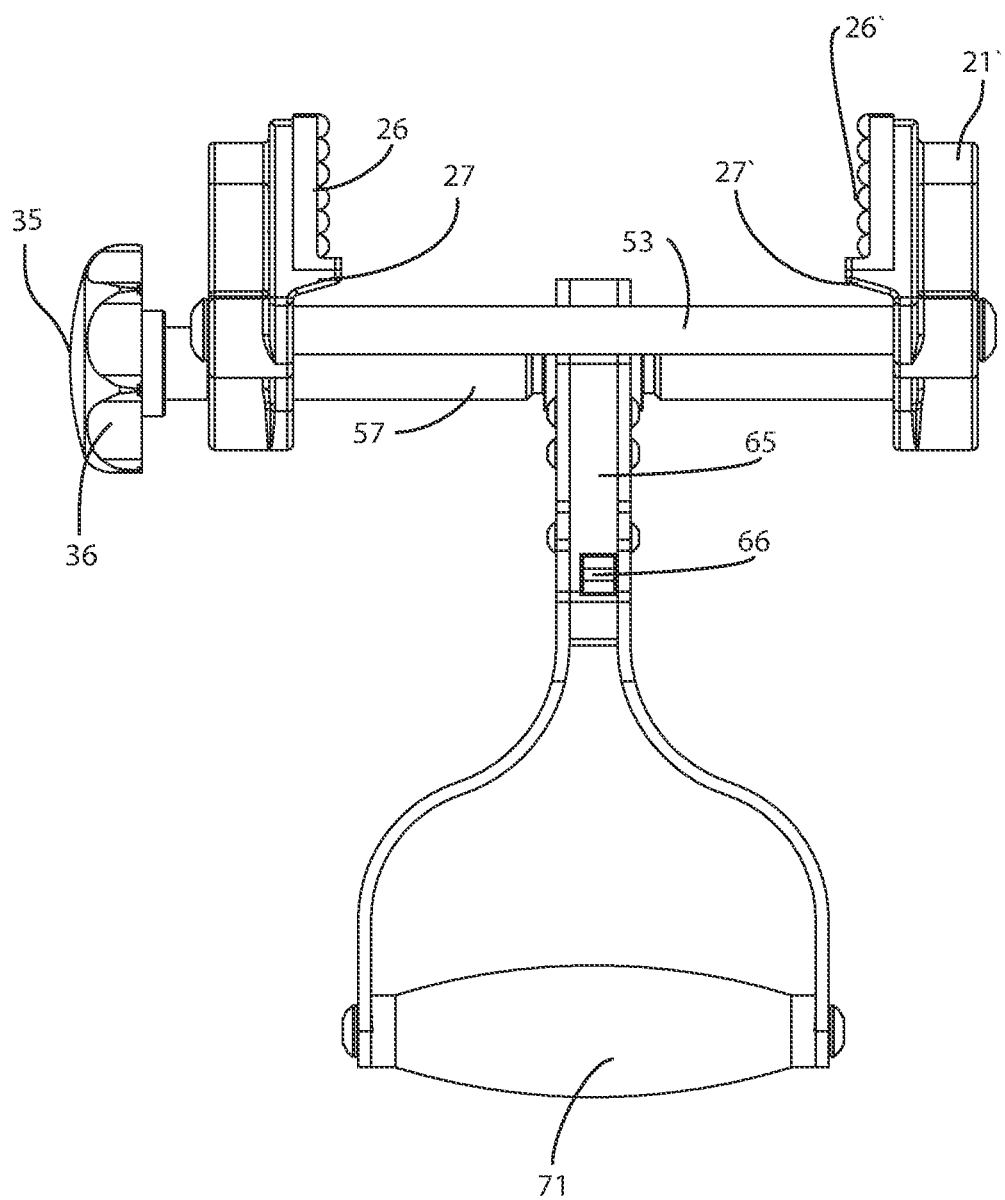
FIG. 2 is an end view of an embodiment of the present invention.
Figure 3:
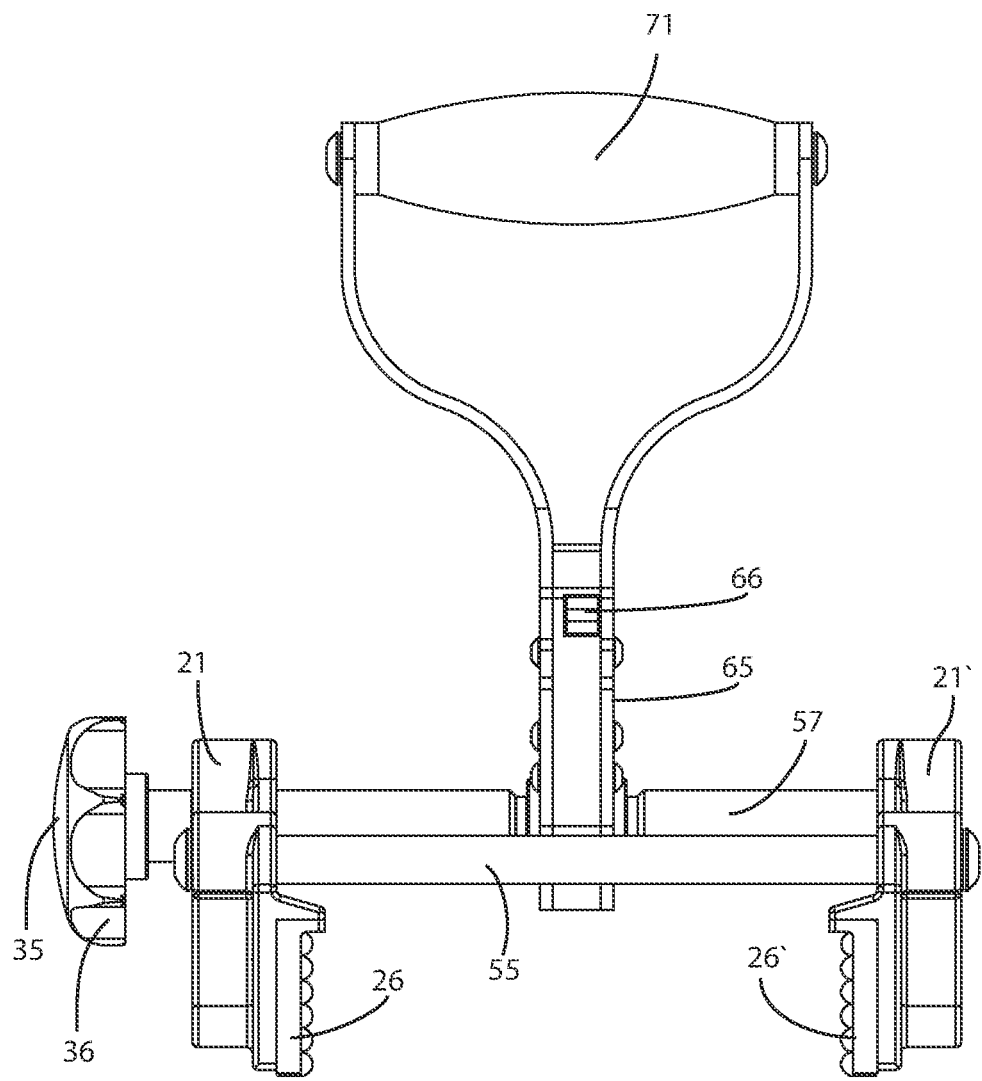
FIG. 3 is an opposite end view of an embodiment of the present invention.
Figure 4:
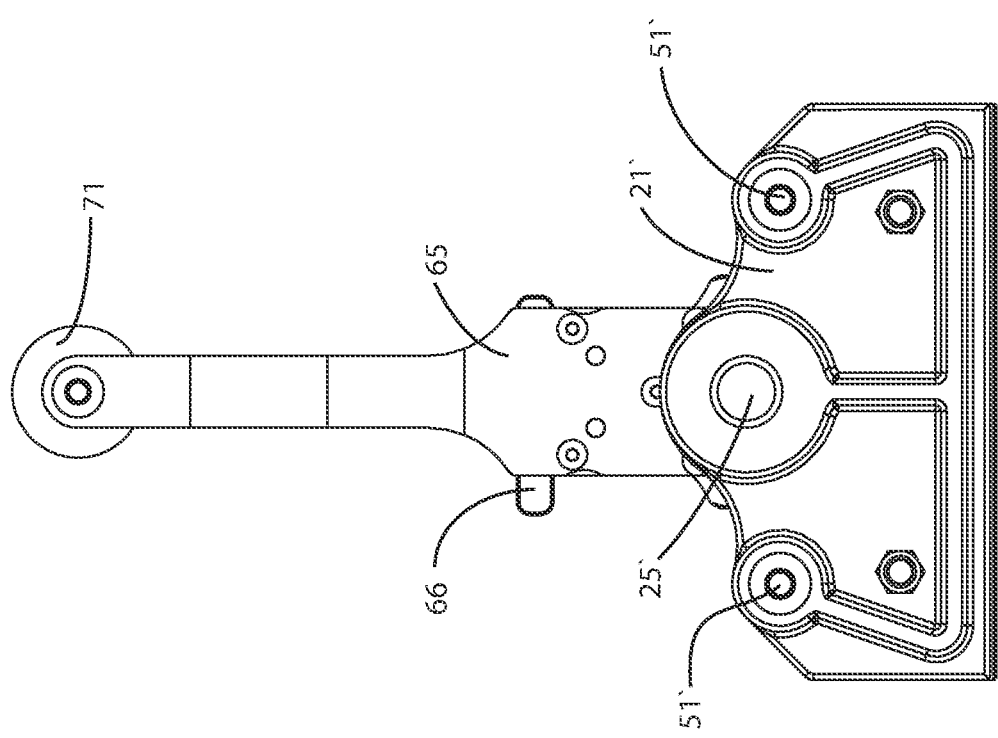
FIG. 4 is a side view of an embodiment of the present invention.
Figure 5:
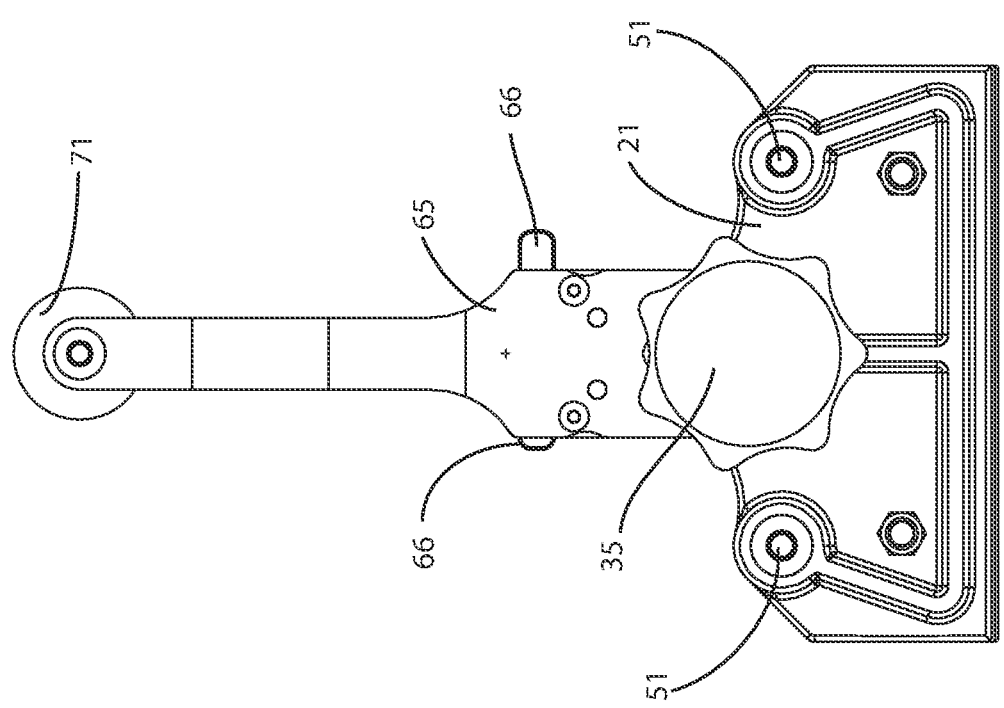
FIG. 5 is an opposite side view of an embodiment of the present invention.
Figure 6:
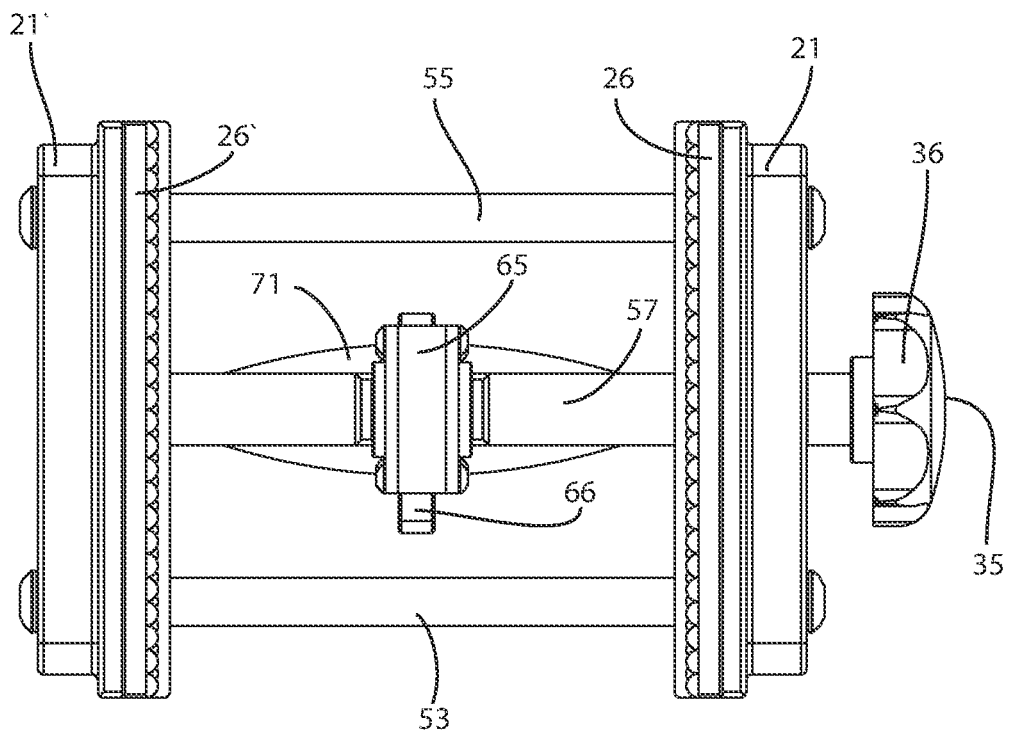
FIG. 6 is a bottom view of an embodiment of the present invention.
Figure 7:
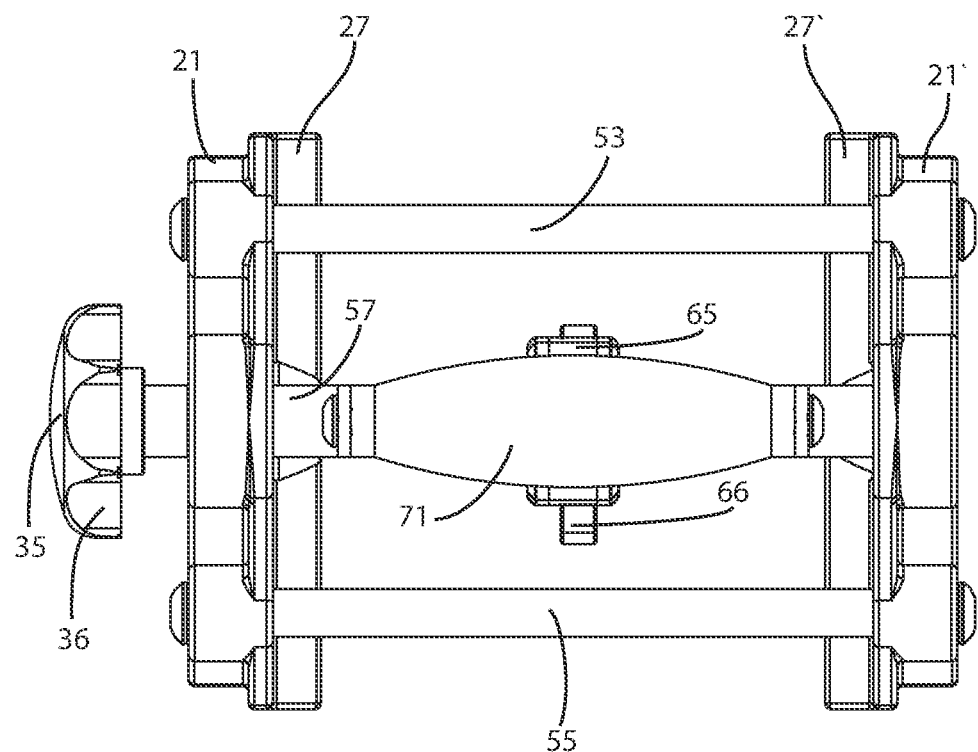
FIG. 7 is a top view of an embodiment of the present invention.

Referring to the drawings, wherein like reference characters designate like or corresponding parts throughout the several views, and referring initially to FIG. 1 it is seen that the illustrated embodiment includes left 21 and right 21' jaw assemblies separated by a first guide rod 53, a second guide rod 55 and a central threaded rod 57. It is to be noted that the illustrations do not show the actual threads on rod 57. It is also to be appreciated that although the illustrated embodiment shows two guide rods (53, 55), in other embodiments, a single guide rod may be used, or more than two guide rods may be used. Jaw members 21, 21' are oriented in parallel to each other, and may be mirror images of each other. Each jaw member 21, 21' has a flat surface thereon that faces the flat surfaces of the other jaw member. Rod 57 has a ratchet assembly 61 at a center thereof. A handle assembly 70 is attached to the ratchet assembly 61, and an adjustment knob 35 is attached at one end of rod 57. In the illustrated embodiment, knob 35 is attached to the left end of rod 57, but in other embodiments knob 35 may be attached to the right end of rod 57. Knob 35 may be threaded onto an end of rod 57, or attached using other suitable means.

Figure 8:
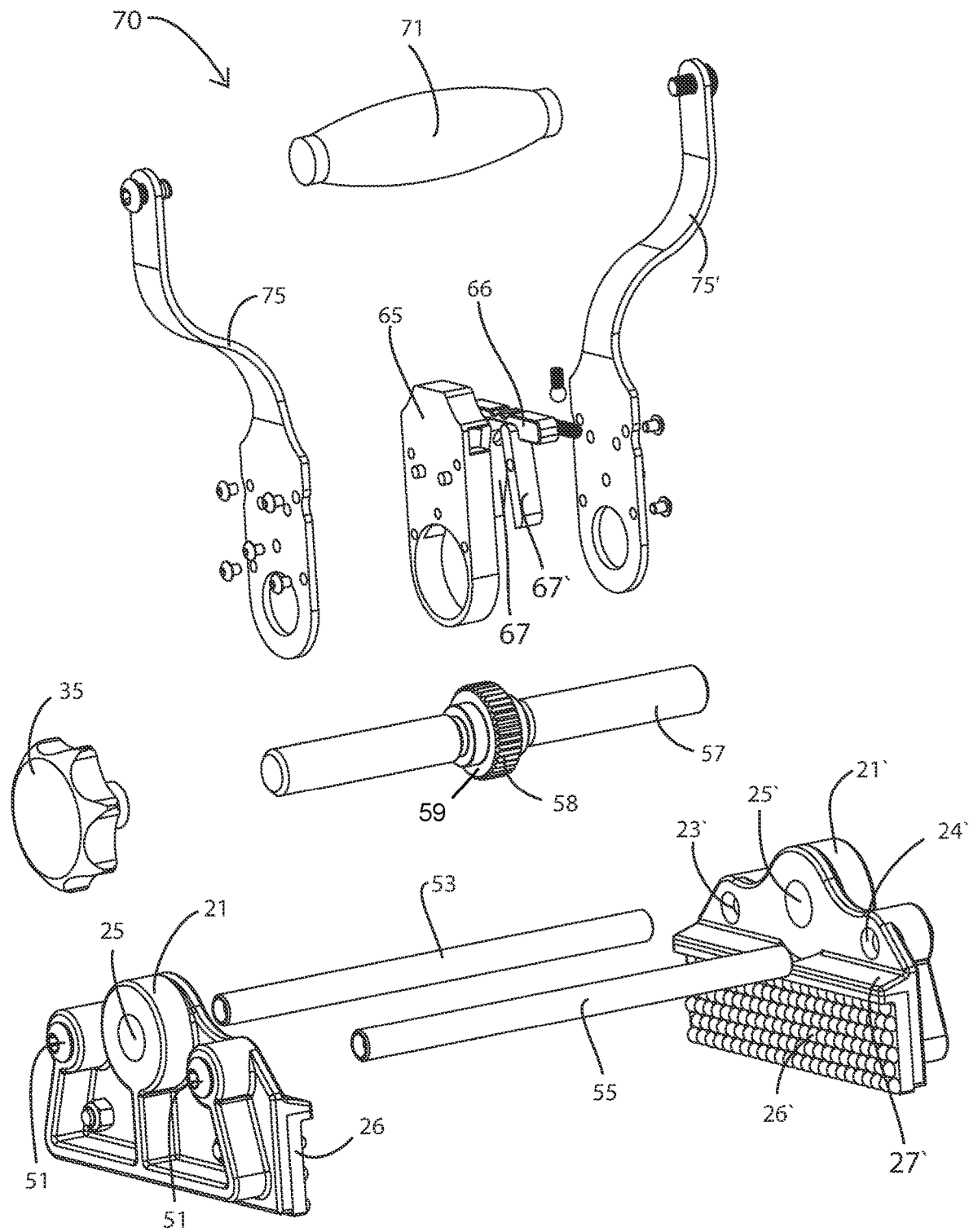
FIG. 8 is an exploded perspective view showing parts of an embodiment of the present invention.
Figure 9:
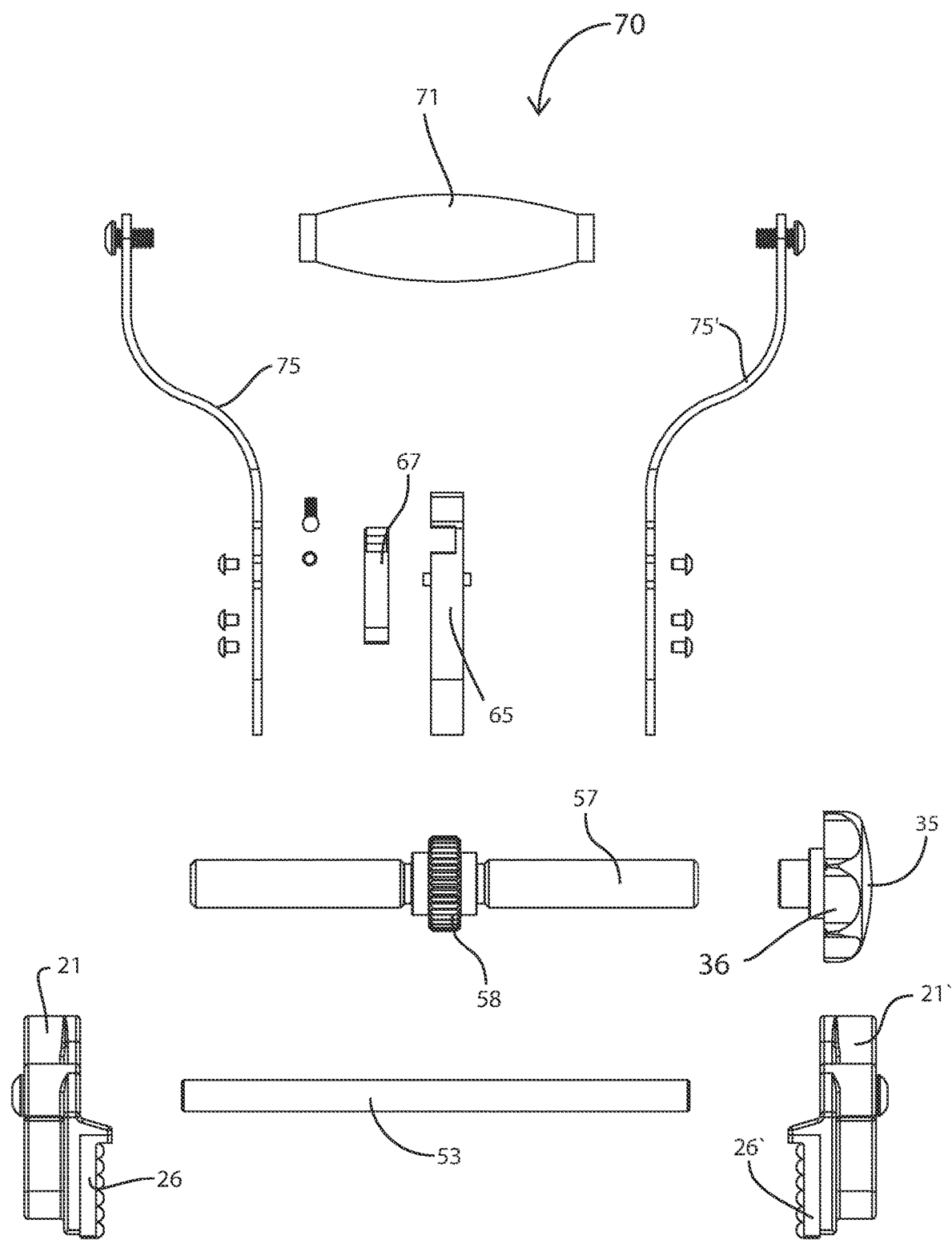
FIG. 9 is an exploded top view showing parts of an embodiment of the present invention.
Figure 11:
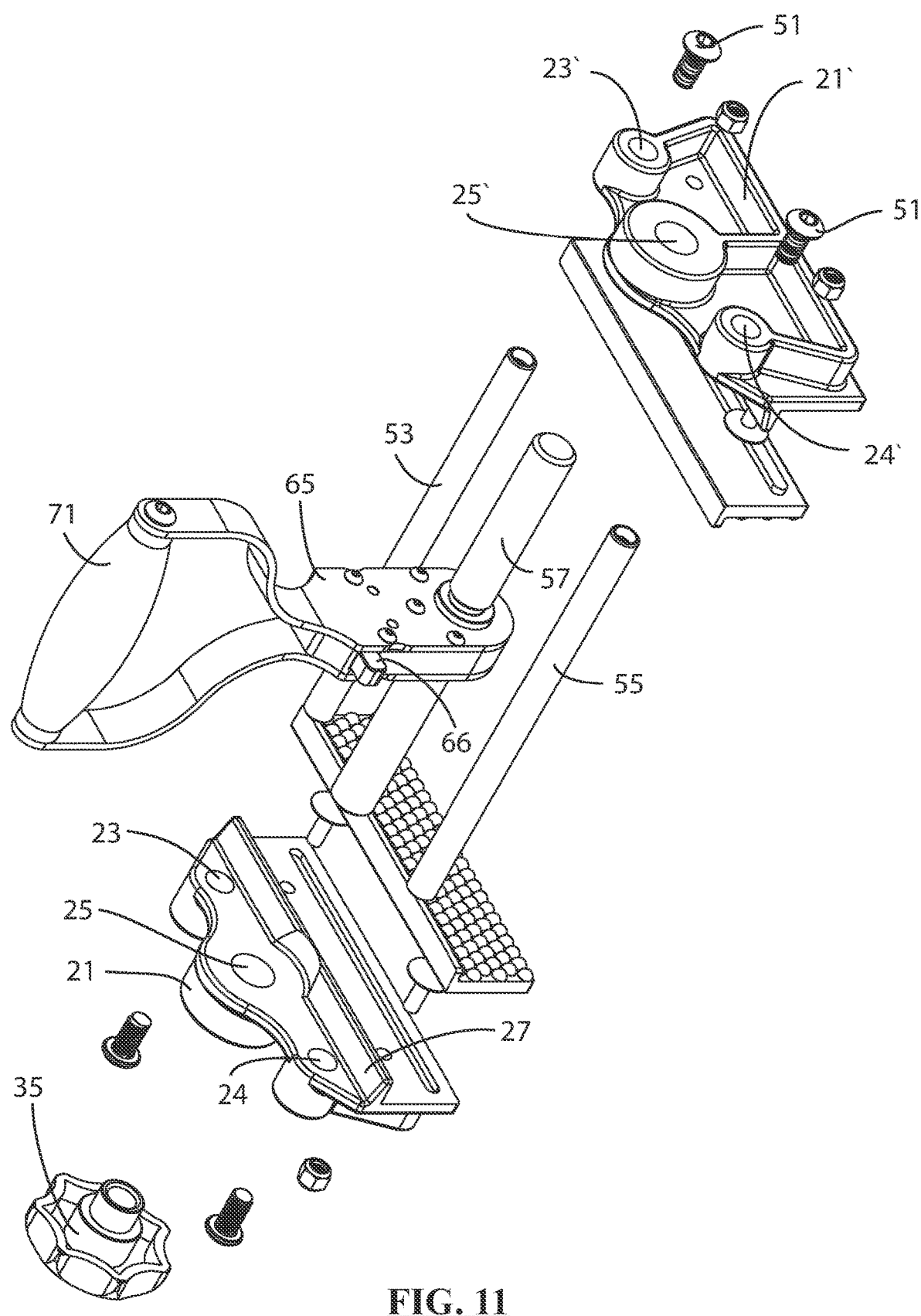
FIG. 11 is a partially assembled perspective view of an embodiment of the present invention.

Referring to FIGS. 8 and 11, it is seen that each jaw assembly 21, 21' includes openings 23, 23' and 24, 24' in the form of bores having smooth interiors that extend therethrough. Openings 23 and 23' are designed to slidably receive ends of rod 53, and openings 24 and 24' are designed to slidably receive ends of rod 55. Rods 53 and 55 act as stabilizers and guides for jaw assemblies 21, 21'. Each jaw assembly 21, 21' also includes a central threaded bore 25, 25' for receiving one of the ends of threaded rod 57. Rod 57 is in the form of a turnbuckle such that the helical threads on one side of the ratchet assembly 65 are angled in one direction, and the helical threads on the opposite side of the ratchet assembly 65 are angled in the opposite direction. (As noted above, the illustrations do not show the actual threads on rod 57.) Similarly, the interior helical threads of first bore 25 are complementary to the threads on one end of rod 57, and the interior helical threads of second bore 25' are complementary to the threads on the opposite end of rod 57. This way, when rod 57 is rotated in one direction, it causes jaws 21 and 21' to be brought closer together, and when rod 57 is rotated in the opposite direction, it causes jaws 21 and 21' to be moved farther apart.

Referring to FIGS. 10B, 10C and 11, it is seen that each jaw assembly 21, 21' includes a rubberized slightly deformable padded member 26, 26' that extends along an interior flat surface of each jaw assembly 21, 21'. In the illustrated embodiment, jaws 26, 26' and deformable members 26, 26' are shown to have an optional L-shaped cross section with an upper lip 27, 27' which, when present, sets a limit for an upper edge of an object to be gripped between the jaws. Deformable members 26, 26' are removeable and replaceable, and may be attached using fasteners 28, 28' which may extend through openings in jaws 21, 21' and may be engaged with nuts 29, 29'. The handle assembly 70 may include a pair of support arms 75, 75' which connect a handle 71 with ratchet assembly 65.

Referring to the exploded view of FIG. 8, it is seen that rod 57 has a central gear member 59 with teeth or cogs 58 extending radially outward therefrom. These teeth engage with pawls 67, 67' of ratchet assembly 65. It is to be appreciated that movement of catch member 66 in one direction causes a first pawl 67 to engage teeth 58 allowing rod 57 to rotate in a first direction, preventing rotation in an opposite direction. Similarly, movement of catch member 66 in an opposite direction causes a second pawl 67' to engage teeth 58 allowing rod 57 to rotate in an opposite direction, preventing rotation in the first direction. This facilitates operation of the ratchet assembly 65 using handle assembly 70. In particular, moving catch member in one direction allows rod 57 to be rotated in only one direction through the reciprocating motion of handle assembly 70. This reciprocating motion, and the resulting rotation of rod 57 inside bores 25, 25' causes jaws 21, 21' to be moved either together or apart. Similarly, moving catch member 66 in the opposite direction allows rod 57 to be rotated in only the opposite direction, again through the reciprocating motion of handle assembly 70. This reciprocating motion, and the resulting opposite rotation of rod 57 inside bores 25, 25' causes jaws 21, 21' to be moved in the opposite direction, either apart or together.

In accordance with the above, ratchet assembly 65 may be used in connection with handle assembly 70 to rotate rod 57, the direction of rotation being dictated by the position of catch 66. Similarly, rotation of rod 57 may also be imparted by rotating knob 35 that is attached to one end of rod 57, with the direction of rotation also being dictated by the position of catch 66. Knob 35 may include a frictional surface or finger grips 36 for easy manipulation. Rotation of knob 35 allows a significant amount of rotation to be imparted to rod 57, which causes significant opening or closing of jaws 21, 21'. Thus, rotation of knob 35 may be used to quickly and easily open or close jaws, 21, 21' at a macro level in order to make room to engage an object, and then hand tighten jaws 21, 21' against the object. The mechanical advantage provided through ratchet assembly 65 and handle assembly 70 makes it possible to open or close jaws 21, 21' at a micro level to impart or remove additional pressure in a measured manner to firmly engage or disengage an object.

In use, in embodiments of the invention knob 35 may rotated in one direction to open up a large space between jaws 21, 21'. For example, and without limitation, this space may be as much as eight inches (8") wide. The open jaws 21, 21' may then be placed around an object having a cross section of less than this space (e.g., a granite slab having a cross section of, for example, six inches—which is less than eight inches). Catch 66 may then be moved to its opposite position, and knob 35 may then be rotated in an opposite direction, bringing jaws 21, 21' together against the object. As jaws 21, 21' close around the object, deformable members 26, 26' make direct contact with the object. Knob 35 may continue to be turned to hand tighten jaws 21, 21' and deformable members 26, 26' against the object. When hand rotation of knob 35 is no longer possible, ratchet 65 may then be employed to continue closure of jaws 21, 21' against the object. Reciprocating motion of handle assembly 70 continues to rotate rod 57 squeezing jaws 21, 21' tightly against the object. Deformable members 26, 26' provide a buffer between jaws 21, 21' and the object, and also help prevent scratching or scraping the object. Once jaws 21, 21' have been firmly engaged against the object with sufficient pressure, the object may then be lifted using handle 71. For large or elongated objects more than one apparatus of the present invention may be engaged with the object in the same way but at different locations to provide additional locations for lifting the object.

It is to be appreciated that if the object is rigid, such as a granite slab to be used as a counter top, considerable pressure may be applied to the object using ratchet 65 to close jaws 21, 21' against the object. In other situations, if the object is not rigid, such as a hollow wooden door, care must be taken not to damage the object by exerting too much pressure through jaws 21, 21'.

To disengage the object, catch 66 of ratchet 65 is moved in the opposite direction and handle assembly 70 is reciprocated to cause rod 57 to rotate in the opposite direction. This moves jaws 21, 21' apart, loosening the grip on the object. After the grip has been sufficiently loosened to release the object, knob 35 may then be turned in the opposite direction to further open jaws 21, 21' allowing them to be easily removed from the object.

Rods 53 and 55 act as guides during the operation of ratchet assembly 65 and rotation of rod 57. In particular, rods 53 and 55 help maintain the positions of jaws 21, 21' in parallel to each other as they are moved apart or together around an object. The ends of rods 53, 55 may be provided with caps 51, 51' to prevent them from slipping out of the apparatus. In some embodiments of the invention, rods 53, 55 may be longer than rod 57. Jaws 21, 21' may be made from a sturdy metal, such as without limitation iron, steel or aluminum, although other suitable materials may be used. Similarly, rod 57 may also be made from a sturdy metal that may be molded or fabricated with helical threads and a central gear. In some embodiments, rod 57 may be provided in three distinct parts, including a first helically threaded rod, a second oppositely helically threaded rod, and a gear, where these three parts are bonded, welded or otherwise securely attached together. Guide rods 53, 55 and plugs 51 may be made from a light or heavy metal, plastic, or other suitable material. Deformable pads 26, 26' may be made from rubber, deformable plastic, or any other suitable rubberized material. The parts of ratchet assembly 65 and handle assembly 70 may be made of sturdy metal, although handle 71 may itself be made from plastic or other similar material.

It is to be appreciated that the distance between jaws 21, 21' may be primarily determined by the length of turnbuckle rod 57. In some embodiments, rod 57 (and in some embodiments, guide rods 53, 55) may have a length of, for example and without limitation, up to about twelve inches (12") allowing for a gap of, for example and without limitation, about eleven inches (11") between jaws 21, 21' to receive an object having a cross section of up to about eleven inches, but also to receive objects having smaller cross sections. In other embodiments, rod 57 may have a shorter length of, for example and without limitation, about six inches (6") allowing for a gap of, for example and without limitation, about five inches (5") between jaws 21, 21' to receive an object having a cross section of up to about five inches, but also to receive objects having smaller cross sections. It is to be appreciated that in some embodiments, the maximum gap between jaws 21, 21' (and the corresponding lengths of rods 53, 55 and 57) may be anywhere from about two inches (2")

to about eighteen inches (18"), as well as any distance in between or beyond; and that all embodiments of the invention may be used to grip any object having a cross section that is any amount less than the maximum distance between jaws 21, 21' of the particular embodiment.

It is to be understood that variations, modifications, and permutations of embodiments of the present invention, and uses thereof, may be made without departing from the scope of the invention. It is also to be understood that the present invention is not limited by the specific embodiments, descriptions, or illustrations or combinations of either components or steps disclosed herein, and that different combinations of the features of the illustrated embodiments may be used in other embodiments, all within the scope of the invention. The illustrated embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

What is claimed is:

1. An apparatus for temporarily gripping objects comprising:
   a. a pair of jaw members provided in a parallel orientation to each other defining a gap therebetween;
   b. a threaded rod having a knob attached at an end thereof, a gear at a center thereof, and a ratchet engaged with said gear for rotating said rod in one of a first or a second opposite direction, wherein threads between said gear and one end of the rod are angled in a first direction, and wherein threads between the gear and an opposite end of the rod are angled in a second opposite direction;
   c. a threaded bore in a first of said jaw members for rotatably receiving one end of said threaded rod, and an oppositely threaded bore in a second of said jaw members for rotatably receiving the opposite end of said threaded rod; and
   d. a handle attached to said ratchet for imparting reciprocating movement thereto,
wherein rotation of said rod in said first direction causes said jaw members to move towards each other and rotation of said rod in said opposite second direction causes said jaw members to move away from each other.

2. The apparatus of claim 1 further comprising at least one guide rod provided between said jaw members, wherein each jaw member includes at least one opening therein for slidably receiving an end of one of said at least one guide rods.

3. The apparatus of claim 1 wherein each jaw member has a flat surface thereon that faces the flat surface of the other jaw member.

4. The apparatus of claim 3 wherein a pad is provided on the flat surface of each jaw member.

5. The apparatus of claim 3 wherein each jaw further comprises a lip along an upper end of said flat surface.

6. The apparatus of claim 5 wherein a pad is provided on the flat surface of each jaw member, each such pad having an L-shaped cross section corresponding to each such lip.

7. The apparatus of claim 1 wherein said gear on said threaded rod has teeth thereon that extend radially outward from the gear wherein said ratchet is engaged with said teeth such that engagement of a first pawl in said ratchet with said teeth allows said rod to be rotated in only said first direction, and engagement of a second pawl in said ratchet with said teeth allows said rod to be rotated in only said second opposite direction.

8. The apparatus of claim 7 further comprising a catch on said ratchet for engaging either said first pawl or said second pawl with said gear.

9. The apparatus of claim 1 wherein the gap between said jaw members may be opened to as wide as twelve inches.

10. A method for temporarily gripping an object comprising the steps of:
    a. rotating a knob attached to an end of a threaded rod in a first direction, such that oppositely threaded ends of said rod engaged with oppositely threaded openings in a pair of parallel jaw members rotate within said openings causing said jaw members to move apart;
    b. placing an object to be gripped between said jaws;
    c. setting a ratchet located at a center of said threaded rod to allow said rod to rotate in an opposite direction;
    d. rotating said knob to rotate said rod in an opposite direction to cause said jaws to move together and close against said object;
    e. operating said ratchet to impart further rotation of said threaded rod to tightly grip said object between said jaws; and
    f. lifting said object using a handle attached to said ratchet.

11. The method of claim 10 comprising the additional steps of
    g. setting said ratchet to rotate said rod in said first direction;
    h. operating said ratchet to impart rotation of said threaded rod in said first direction to release said jaws from said object; and
    i. rotating said knob to rotate said rod in said first direction to further loosen said jaws from said object.

12. An apparatus for temporarily gripping objects comprising:
    a. a pair of jaw members provided in a parallel orientation to each other defining a gap therebetween;
    b. a threaded rod having a center, wherein threads between the center of the rod and one end of the rod are angled in a first direction, and wherein threads between the center of the rod and an opposite end of the rod are angled in a second opposite direction;
    c. a ratchet located at the center of the rod for rotating the rod in one of a first or a second opposite direction;
    d. a threaded bore in a first of said jaw members for rotatably receiving one end of said threaded rod, and an oppositely threaded bore in a second of said jaw members for rotatably receiving the opposite end of said threaded rod;
    e. a handle attached to said ratchet for imparting reciprocating movement thereto; and
    f. at least one guide rod provided between said jaw members, wherein each jaw member includes at least one opening therein for slidably receiving an end of one of said at least one guide rods,
wherein rotation of said rod in said first direction causes said jaw members to move towards each other and rotation of said rod in said opposite second direction causes said jaw members to move away from each other.

13. The apparatus of claim 12 wherein each jaw member has a flat surface thereon that faces the flat surface of the other jaw member.

14. The apparatus of claim 13 wherein a pad is provided on the flat surface of each jaw member.

15. The apparatus of claim 12 further comprising a knob attached at one end of said threaded rod.

16. The apparatus of claim 12 wherein a gear is provided at the center of said rod having teeth thereon that extend radially outward from the gear wherein said ratchet is engaged with said teeth such that engagement of a first pawl in said ratchet with said teeth allows said rod to be rotated in only said first direction, and engagement of a second pawl in said ratchet with said teeth allows said rod to be rotated in only said second opposite direction.

17. The apparatus of claim 16 further comprising a catch on said ratchet for engaging either said first pawl or said second pawl with said gear.

18. An apparatus for temporarily gripping objects comprising:
   a. a pair of jaw members provided in a parallel orientation to each other defining a gap therebetween;
   b. a threaded rod having a center and a knob attached at an end thereof, wherein threads between the center of the rod and one end of the rod are angled in a first direction, and wherein threads between the center of the rod and an opposite end of the rod are angled in a second opposite direction;
   c. a ratchet located at the center of the rod for rotating the rod in one of a first or a second opposite direction;
   d. a threaded bore in a first of said jaw members for rotatably receiving one end of said threaded rod, and an oppositely threaded bore in a second of said jaw members for rotatably receiving the opposite end of said threaded rod; and
   e. a handle attached to said ratchet for imparting reciprocating movement thereto,
   wherein rotation of said rod in said first direction causes said jaw members to move towards each other and rotation of said rod in said opposite second direction causes said jaw members to move away from each other.

19. An apparatus for temporarily gripping objects comprising:
   a. a pair of jaw members provided in a parallel orientation to each other defining a gap therebetween;
   b. a threaded rod having a center, wherein threads between the center of the rod and one end of the rod are angled in a first direction, and wherein threads between the center of the rod and an opposite end of the rod are angled in a second opposite direction;
   c. a ratchet located at the center of the rod for rotating the rod in one of a first or a second opposite direction;
   d. a threaded bore in a first of said jaw members for rotatably receiving one end of said threaded rod, and an oppositely threaded bore in a second of said jaw members for rotatably receiving the opposite end of said threaded rod;
   e. a handle attached to said ratchet for imparting reciprocating movement thereto; and
   f. a gear on said threaded rod having teeth thereon that extend radially outward from the gear wherein said ratchet is engaged with said teeth such that engagement of a first pawl in said ratchet with said teeth allows said rod to be rotated in only said first direction, and engagement of a second pawl in said ratchet with said teeth allows said rod to be rotated in only said second opposite direction, wherein rotation of said rod in said first direction causes said jaw members to move towards each other and rotation of said rod in said opposite second direction causes said jaw members to move away from each other.

20. The apparatus of claim 19 further comprising a catch on said ratchet for engaging either said first pawl or said second pawl with said gear.

* * * * *